May 15, 1928.  
F. F. COON, JR  
MEDICAMENT INJECTOR  
Filed April 16, 1927
1,669,601
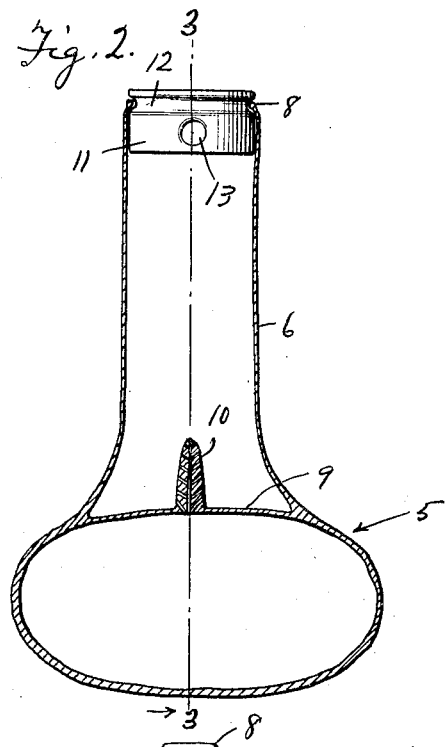
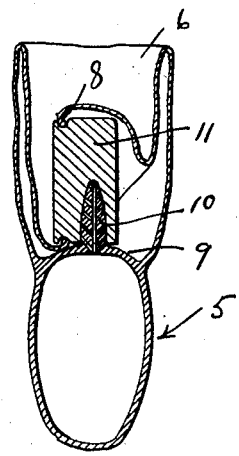
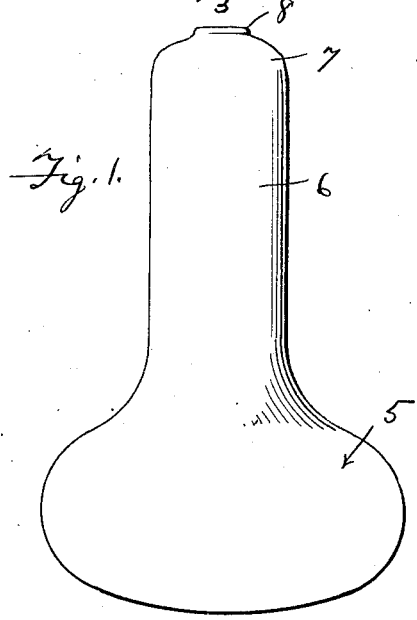
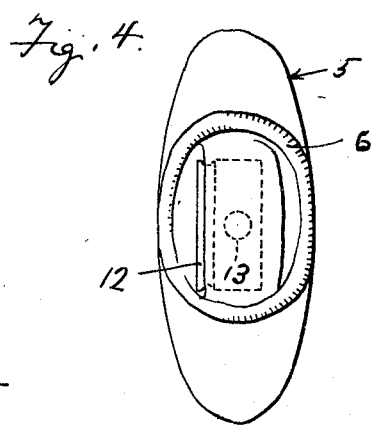
Inventor  
*F. F. Coon Jr.*  
By *Clarence A. O'Brien*  
Attorney Patented May 15, 1928.

1,669,601

UNITED STATES PATENT OFFICE.

FRANK F. COON, JR., OF WASHINGTON, DISTRICT OF COLUMBIA.

MEDICAMENT INJECTOR.

Application filed April 16, 1927. Serial No. 184,319.

This invention relates to a safety appliance which I have chosen to designate as a medicament injector, that is, a device constructed to provide a feasible means for self or individual use in the treatment and prevention of certain ailments liable to offend the human penis.

More precisely, the invention has reference to what is believed to be a thoroughly practical, modern appliance made especially advantageous in that it is highly adaptable for carrying in one's pocket in order to render it readily available for use whenever desired.

I aim particularly to provide an article of this class which is characterized by such indispensable features as compactness, simplicity, inexpensiveness of manufacture and sale, and sanitation in use.

The structural details and their particular organization will become more readily apparent from the following description and drawings.

In the accompanying drawings forming a part of this application, in which like numerals are employed to designate like parts throughout the same:—

Figure 1 is a side elevational view of the improved article ready for use.

Fig. 2 is a central vertical sectional view cut through the same showing the internal consruction, and further showing a cork stopper.

Fig. 3 is a view taken at right angles to Fig. 2, approximately upon the plane of the line 3—3 of Fig. 2, looking in the direction of the arrow, and showing the shield folded down.

Fig. 4 is a top plan view of Fig. 3.

In order that the reader may obtain a clear conception of the particular construction selected for illustration, the parts thereof, will be designated by numerals. Before taking up this detailed description however, it is desired to point out that the device as illustrated in the drawing is the preferable structure for carrying the invention into effect, it being understood that the shape of parts as well as proportions will be varied as desired.

With the foregoing in view, it will be noticed that the reference character 5 designates generally a bulbous-shaped medicament container. This is of somewhat elliptical configuration and is formed of rubber of an appropriate texture, to render it pliable yet durable, and of sufficient rigidity.

In addition to operating as a container for the medicament at 5, the latter functions as a compressible bulb to be held in the hand of the user. Formed integral with, and rising from the top of the bulbous container is an upstanding tubular rubber shield 6, adapted to enclose the penis. From Fig. 1, it will be noticed that this shield is contracted and rounded as indicated at 7 at its upper end, and terminates in a restricted opening surrounded by an elastic retention bead 8. The bead is obviously capable of being expanded to the proportion represented in Fig. 2.

At the juncture of the shield 6 and the container 5 is a diaphragm 9 formed with a centrally disposed upstanding projection 10 of tapered configuration and provided with a multiplicity of orifices or openings. Obviously this part 10 forms a discharge nozzle through and from which the medicament is sprayed.

Attention is now directed to the cork stopper 11 which is adapted to be fitted into the opening at the upper end of the shield. The cork is here shown as circular in form and flat on its top and bottom. Also it is provided near its top with an annular groove 12 for reception of the bead 8. In addition, it is provided on one side with a tapered socket 13 for reception of the nozzle 10.

The container 5 is adapted to hold a comparatively small quantity of an appropriate antiseptic solution of a character to effectively treat the case at hand. Assuming that it is desired to use the device, it is understood that the solution is introduced through the opening at the top of the shield in Fig. 6, and allowed to gravitate into the bulbous container 5. Then, the elastic shield 6 is placed about the organ in an obvious manner, so that it will effectively envelop the same.

The nozzle 10 is inserted gently and slightly into the entrance of the passage. Then the bulbous container 5 is pressed in an ordinary manner to spray a small quantity of the antiseptic solution into the end of the passage. Incidentally, the resilient bead 8 about the base of the organ will prevent leakage to prevent contact of the hands with the fluid, and to otherwise make for sanitation and convenience in use.

The device may then be made ready for placement in an appropriate pocket container (not shown). The cork stopper 11 is placed in position as shown in Fig. 2, and is then forced inwardly and downwardly, at the same time turning it so that the edge or rim portion can be brought into the position shown in Fig. 3. As represented in Fig. 3, the nozzle 10 has entered the socket 13, thus providing a leak-proof closure for the nozzle.

While the fold is shown merely double, in Fig. 3, it is understood that it may be further folded and the plies of rubber brought together to make a very handy and convenient package, such as may be safely carried in one's pocket, without annoyance.

It is thought that by considering the description in connection with the drawings, a clear understanding of the construction, method of use, and advantages of the invention will be had. Therefore, a more lengthy description is thought unnecessary.

Having thus described my invention, what I claim as new is:—

1. As a new product of manufacture, a medicament injector comprising a compressible medicament container of bulbous formation provided on its top with a comparatively short tapered apertured discharge spray nozzle, and a tubular upstanding shield carried by said container and surrounding and projecting above said nozzle and terminating at its upper end in a reinforced restricted entrance opening.

2. As a new product of manufacture, a medicament injector comprising a compressible medicament container of bulbous formation provided on its top with a comparatively short tapered apertured discharge spray nozzle, and a tubular upstanding shield carried by said container and surrounding and projecting above said nozzle and terminating at its upper end in a reinforced restricted entrance opening, together with a closing cork fitted snugly in said opening and provided with a socket for reception of said nozzle, whereby to function as a closing valve for the nozzle.

In testimony whereof I affix my signature.

FRANK F. COON, Jr.